United States Patent [19]

Stenudd

[11] 3,936,650
[45] Feb. 3, 1976

[54] DIRECTION OF MOVEMENT SENSING DEVICE FOR A PERFORATED CODE CARRIER TAPE

[75] Inventor: Sven Gunnar Valter Stenudd, Lidingo, Sweden

[73] Assignee: Facit Aktiebolag, Atvidaberg, Sweden

[22] Filed: Apr. 1, 1974

[21] Appl. No.: 456,820

[30] Foreign Application Priority Data
Apr. 2, 1973  Sweden.............................. 7304585

[52] U.S. Cl. ................. 250/571; 250/239; 356/199
[51] Int. Cl.² ......................................... G01N 21/30
[58] Field of Search .......... 250/566, 568, 570, 555, 250/569, 239, 237 G, 231 SE, 571; 356/199

[56] References Cited
UNITED STATES PATENTS

| | | |
|---|---|---|
| 2,916,624 | 12/1959 | Angel et al. ......................... 250/570 |
| 2,944,157 | 7/1960 | McAuslan et al. ........ 250/231 X SE |
| 3,067,934 | 12/1962 | Amacher et al. ................ 250/239 X |
| 3,143,655 | 8/1964 | Strandberg.......................... 250/239 |
| 3,248,554 | 4/1966 | Chexl............................... 250/569 X |
| 3,469,103 | 9/1969 | Erpel .................................. 250/570 |
| 3,749,925 | 7/1973 | Hertrich.......................... 250/237 G |
| 3,768,911 | 10/1973 | Erickson......................... 250/237 G |
| 3,808,447 | 4/1974 | Leaveni, Jr. ......................... 250/569 |

*Primary Examiner*—Walter Stolwein
*Attorney, Agent, or Firm*—Alfred E. Miller

[57] ABSTRACT

A direction sensing device for a punched tape which is capable of movement linearly through an optical reading apparatus. The device is of a simplified design that is easily incorporated with the optical reading apparatus. The basic structure includes means for dividing the light projected from the light source, and a pair of photosensitive members that are activated in sequence thereby determining the direction of movement of the tape.

3 Claims, 5 Drawing Figures

DIRECTION OF MOVEMENT SENSING DEVICE FOR A PERFORATED CODE CARRIER TAPE

It is an object of the present invention to provide a direction sensing device for a perforated code carrier tape for use with an optical reading apparatus which does not contain movable parts and is simple and inexpensive to manufacture.

It is a further object of the present invention to provide a direction sensing device of an optical type which can be mounted in an existing reading head.

Another object of the present invention is to provide a reader head housing having a split channel, each part thereof being provided with a separate photosensitive member. The light beams are divided in the split channel in a manner to indicate the direction of movement of the perforated code carrier tape.

The invention will now be more fully described with reference to the accompanying drawings in which.

DESCRIPTION OF THE PREFERRED EMBODIMENT

Figure 1:
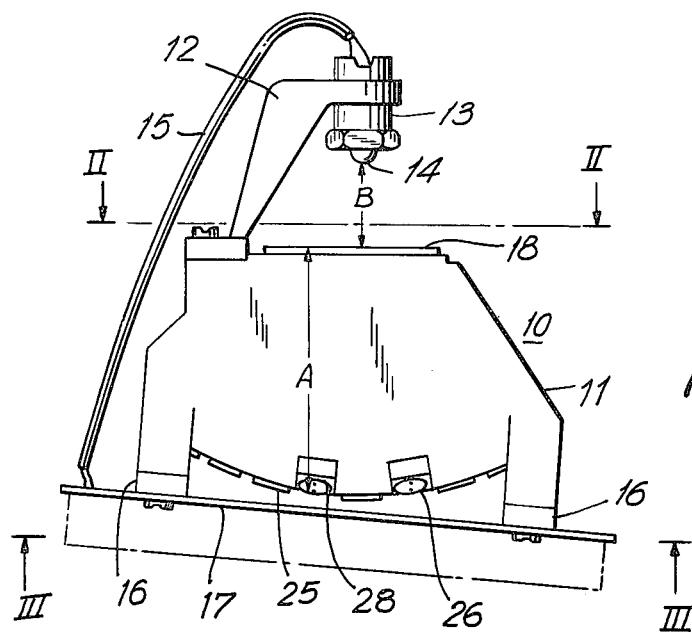
FIG. 1 is a front elevational view of the optical reading device for a perforated code carrier tape having a direction sensing means constructed in accordance with the teachings of my invention.
Figure 2:
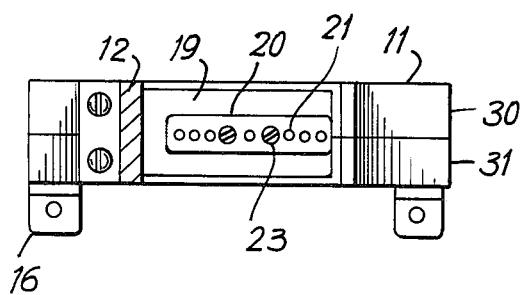
FIG. 2 is a top plan view of the device shown in FIG. 1 partly in section
Figure 3:
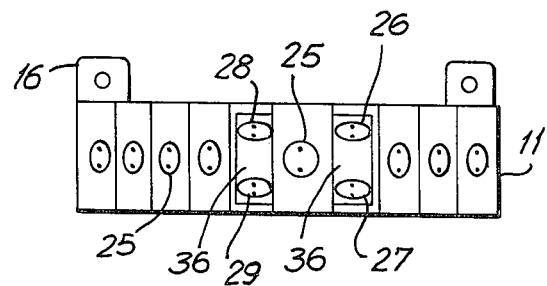
FIG. 3 is a bottom plan view of the device shown in FIG. 1.

As seen in FIG. 1, the reading head is referred to generally by the numeral 10 and comprises a block-like housing 11. Positioned on the top of the housing 11 is a cantilever arm 12, the free end of which mounts a socket 13 for supporting the light emitting diode 14. A conductor 15 supplies current to the diode 14 from a power supply (not shown). As illustrated in FIGS. 1–3 the reading head 10 may be secured to the support 17 of a punched tape reader (not shown) by means of attachment flanges 16.

Figure 4:
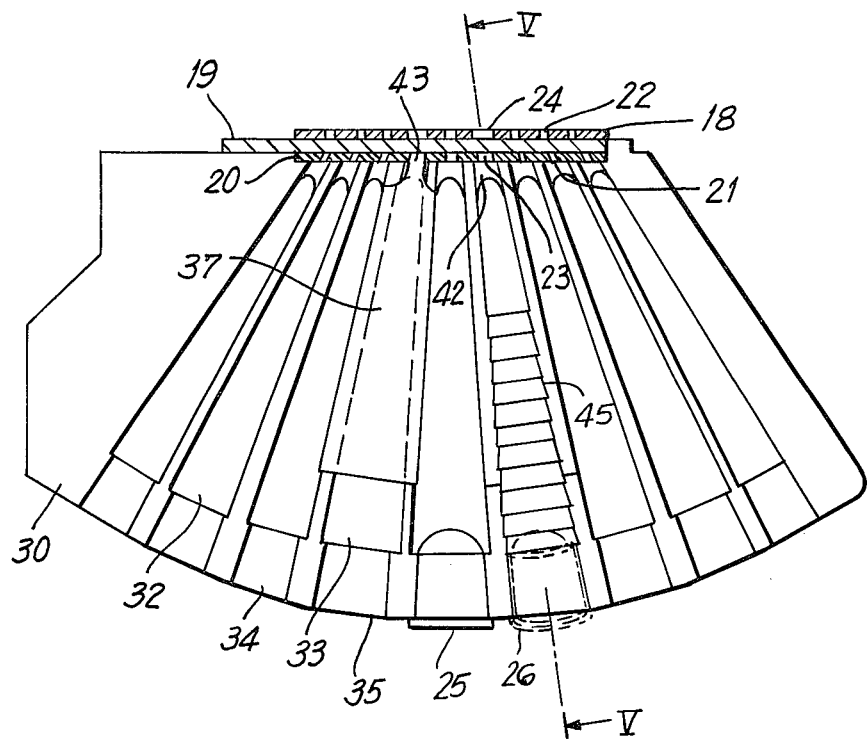
FIG. 4 is a detail of construction shown on an enlarged scale.
Figure 5:
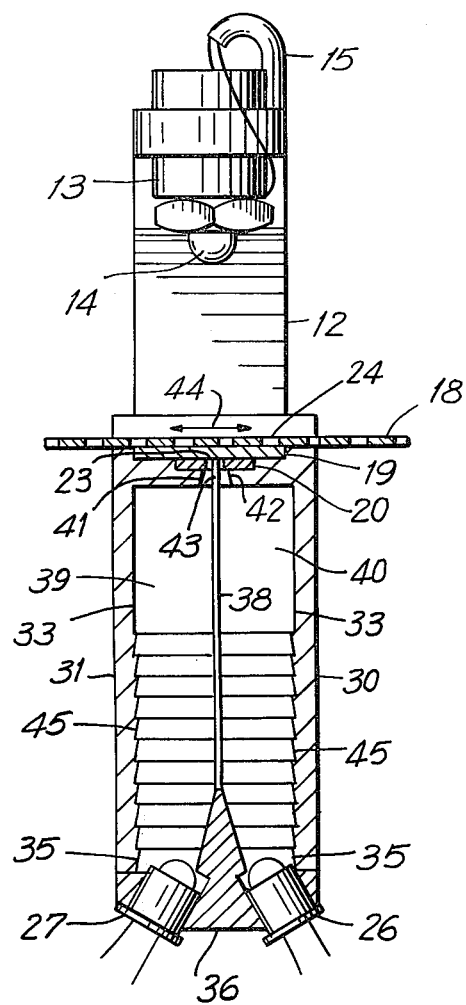
FIG. 5 is another detail of construction shown on an enlarged scale.

It should be noted that the reading head 10 may be utilized to read the punched tape 18 shown in FIGS. 1, 4 and 5. The tape 18 is illustrated in cross-section in FIG. 4 but in longitudinal section in FIG. 5. Referring to FIG. 4, the punched tape 18 moves over the translucent plate 19 fabricated, for example, of glass or plastic. Positioned under plate 19 is a perforated plate 20 having holes 21 which correspond to the code carrying holes 22 of the punched tape 18. The plate 20 is further provided with holes 23 that correspond to the guide holes 24 in the punched tape 18. Phototransistors 25 and 26 sense the light passing from the light emitting diode 14 through the holes in the punched tape 18 and the perforated plate 20. The light further passes to the photosensitive members, such as phototransistors 25, which correspond to the holes 22 punched in the tape 18. As seen in FIG. 3, the housing 11 is provided with two pairs of phototransistors that correspond to the guide holes 24 in the punched tape 18. One pair of phototransistors is denoted by the reference numerals 26 and 27 while the other pair of phototransistors is referred to by the reference numerals 28 and 29 respectively.

Referring to FIG. 2, the block-like housing 11 is shown comprising two substantially identical, complimentary parts 30 and 31. The part 30, is illustrated on an enlarged scale having grooves 32 for housing the phototransistors 25 and grooves 33 which seat the pairs of phototransistors 26, 27 and 28, 29 respectively. The two parts 30 and 31, when joined together as seen in FIG. 2, form a structure in which the opposed complimentary grooves 32 and 33 became channels through which the light beams emanating from the light emitting diode 14 project toward the phototransistors. As seen in FIG. 4, the outer ends 34 of the channels housing the phototransistors 25 are so shaped that the phototransistor elements may be easily secured in the channels.

As seen in FIG. 5, the outer ends of the grooves 33 are angularly shaped whereby a holder 36 is inserted therein. The holder 36 engages and supports a pair of photosensitive members such as phototransistors 26 and 27 respectively.

A study of FIGS. 4 and 5 will reveal that the grooves 33 are provided with partitions 37 and 38. The latter may be provided with flanges or other suitable attachment means (not shown) for securement to the grooves 33. As seen in FIG. 5, when the complementary parts 30 and 31 are secured together the grooves 33 and a centrally located partition 38 will form two separate channels 39 and 40 respectively. The grooves 33 are considerably reduced in size adjacent to the position of the punched tape 18 and form narrow channels 41 and 42. As will be observed from FIG. 5, the channels 41 and 42 are directly under and communicate with the hole 23 in the perforated plate 20. Moreover, the size of the hole 23 corresponds generally to the size of guide hole 24 in the punched tape 18. The upper end of the partition 38 is provided with a tab 43 which projects into hole 23 and divides the hole into two similar portions.

Referring to FIG. 5 it will be noted that the punched tape 18 is capable of movement in two directions in accordance with the double arrow 44.

Assuming that the tape 18 moves from right to left in FIG. 5, the following will occur: If there is no guide hole 24 located above the hole 23 in the plate 20 no light will reach the phototransistors 26 and 27. Thereafter, when the guide hole 24 approaches the hole 23, light from diode 14 will at first pass through the right hand half of the hole, through the channel 40 underneath, and finally reach the phototransistor 26 which emits a corresponding signal to a circuit, for example a logic circuit. When the tape 18 moves a little further in the same direction light will also pass through the left hand half of the hole 23, the channel 30, and finally the phototransistor 27 which also emits a corresponding signal to a logic circuit. The continued movement of the punched tape 18 will at first block light from falling on phototransistor 26 and finally block light from reaching the phototransistor 27. If the signals emitted from the phototransistors are denoted by M (dark) and L (light) the following signal diagram will be obtained when the punched tape 18 moves from right to left in FIG. 5:

| Phototransistor | |
|---|---|
| 27 | 26 |
| M | M |
| M | L |
| L | L |
| L | M |

-continued

| Phototransistor | |
|---|---|
| 27 | 26 |
| M | M |
| L | M |
| L | L |
| M | M |
| M | M |

When the punched tape 18 moves in the opposite direction, i.e. from left to right the following signal diagram will be in effect occurs:

| Phototransistor | |
|---|---|
| 27 | 26 |
| M | M |
| L | M |
| L | L |
| M | M |
| M | M |

The signals which are detected by the phototransistors are evaluated in a known manner by an evaluating device having logic circuits.

As seen in the drawings, the light emitting diode 14 is located at a considerable distance from the punched tape 18. Moreover, the phototransistors 25-29 are situated at a much greater distance from the punched tape 18, being preferably double the distance of the diode to the punched tape 18. As a result of the foregoing construction and arrangement a large contrast is obtained, i.e., a large difference between light intensities corresponding to light and dark respectively detected by the phototransistors. This happens since the light from the diode 14 passes through an aligned perforation or hole in the punched tape 18 and continues straight downwardly, whereas if no hole is present in the punched tape, the lighted paper surface will generally function as an omnidirectional radiating light source. Accordingly, the light spreads so much that only a negligable part will reach the photosensitive members. This desirable effect is further enhanced by the small range of the light source which emits diverging radiation only. If the intensity of the light source 14 is great then the photosensitive members may be disposed remote from the code carrier tape 18. In this manner fewer light rays from the omnidirectional radiating surface can fall on the photosensitive members.

FIG. 5 shows a detail of construction of the present device comprising stepped indentations in the form of consecutive inclined surfaces 45. It will be noted that the inclination of the surfaces is such that the reflected light from the interior walls are prevented from reaching the phototransistors.

The punched tape 18 may be rotated 180°. The direction of tape movement can be sensed by the present device even if the punched tape is not symmetrical, for example if the tape has only one row of guide holes 24, since the device has two pairs of symmetrically disposed phototransistors, i.e. 26, 27 and 28, 29 with associated partitions or light dividing means.

I claim:

1. A device for sensing the direction of movement of a perforated code carrier tape comprising a light source positioned on one side of said tape, at least one elongated enclosed channel, a longitudinally extending partition dividing said channel into two longitudinal sections, at least one pair of photosensitive members located at the other side of said tape and at a distance therefrom at one end of said channel, one photosensitive member of said pair being located in one longitudinal section while the other photosensitive member is located in the other longitudinal section, means upon movement of said tape in a predetermined direction for dividing the light emitted from said light source and passing the light through one part of a hole in said code carrier tape and through one of said divided longitudinal sections of said channel for directing said light to one of said pair of photosensitive members, said light passing through another part of said hole and through the other divided longitudinal section of said channel for directing said light to the other photosensitive member upon the continued movement of the tape in said predetermined direction, the end of said channel adjacent to said code carrier tape being provided with an opening of reduced dimensions, the size of which corresponds to the size of the hole in said code carrier tape, said partition having a tab projecting into said opening which is integral with said partition to thereby divide said opening into two portions of substantially the same size.

2. The device as claimed in claim 1 further comprising a housing which is constituted of two complementary parts, each of said parts having grooves which form elongated channels when said parts are joined together.

3. The device as claimed in claim 1 wherein said photosensitive members are located approximately double the distance to said code carrier tape as the distance from said light source to said tape.

* * * * *